United States Patent [19]
Bakeev et al.

[11] Patent Number: 6,117,929
[45] Date of Patent: Sep. 12, 2000

[54] METHOD FOR PREVENTING OR RETARDING THE FORMATION OF GAS HYDRATES

[75] Inventors: Kirill N. Bakeev, Ringwood; Jui-Chang Chuang, Wayne; Michael A. Drzewinski, Long Valley, all of N.J.; David E. Graham, Chiddingfold, United Kingdom

[73] Assignee: ISP Investments Inc., Wilmington, Del.

[21] Appl. No.: 09/204,768

[22] Filed: Dec. 3, 1998

[51] Int. Cl.$^7$ ........................................................ C07C 7/20

[52] U.S. Cl. ................................ 524/376; 137/3; 137/13; 210/698; 585/15; 585/950

[58] Field of Search .............................................. 524/376

[56] References Cited

U.S. PATENT DOCUMENTS

| | | | |
|---|---|---|---|
| 4,644,028 | 2/1987 | Fischer | 524/376 |
| 4,663,379 | 5/1987 | Fischer | 524/376 |
| 4,761,439 | 8/1988 | Braeken | 523/122 |
| 5,723,524 | 3/1998 | Cohen | 524/376 |

*Primary Examiner*—Paul R. Michl
*Attorney, Agent, or Firm*—Walter Katz; William J. Davis; Marilyn J. Maue

[57] ABSTRACT

A composition is provided herein for preventing or retarding the formation of gas hydrates or for reducing the tendency of gas hydrates to agglomerate, during the transport of a fluid comprising water and a hydrocarbon, through a conduit. The composition is a homopolymer of vinyl caprolactam having the low molecular weight in the range of 500 to 2500, or copolymers thereof, in a defined solvent. Such homopolymers and copolymers preferably are made and applied in the defined solvent, which, most preferably, is a glycol ether such as 2-butoxyethanol.

4 Claims, No Drawings

METHOD FOR PREVENTING OR RETARDING THE FORMATION OF GAS HYDRATES

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition to the fluid of a low molecular weight vinyl caprolactam polymer, or copolymers thereof, which are preferably made and applied in a suitable solvent, to inhibit such gas hydrate formation.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following U.S. Pat. Nos. 4,915,176; 5,420,370; 5,432,292; and 5,723,524; EPA 0526929A1; EPO 0323774Al; Can. Pat. Appln 2,073,577; WO 93/25798; WO 95/17579; Gas Hydrates and Hydrate Prevention 73 GPA Annual Convention, pgs 85–93; WO 96/08456; WO 96/08636; WO 93/25798; EPA 0457375A1 and WO 9412761.

The poly(vinyl caprolactam) (PVCL) described in U.S. Pat. No. 5,723,524 was synthesized in isopropanol and had an average molecular weight of 36,000 amu, as determined using size exclusion chromatography, otherwise known in the art as gel permeation chromatography (GPC, polyethylene glycol as standard).

SUMMARY OF THE INVENTION

What is described herein is a useful composition for effectively preventing or retarding the formation of gas hydrates, or for reducing the tendency of gas hydrates to agglomerate, during the transport of a fluid comprising water and a hydrocarbon, through a conduit, comprising a vinyl caprolactam homopolymer (PVCL) having a low molecular weight, of about 500 and about 2500, or copolymers thereof, preferably with vinyl pyrrolidone (VP), in a suitable solvent. Preferably, the homopolymer or copolymer is made and applied in a low molecular weight glycol ether, which, most preferably, is 2-butoxyethanol (BGE).

DETAILED DESCRIPTION OF THE INVENTION

The polymer which exhibits advantageous inhibitory characteristics in the composition of the invention is a homopolymer of vinyl caprolactam, or copolymer thereof, having a molecular weight of about 500 to about 2500, as determined by GPC using polyethylene glycol as the standard.

Generally, the polymer used is present in an amount of about 30 to 50% by weight of the composition, i.e. in admixture with the solvent. The polymer inhibition concentration in the pipeline, i.e. the aqueous phase, is about 0.1 to 3% by weight. The solvent inhibition concentration, accordingly, is about 0.1 to 5% by weight in the aqueous phase.

Suitable solvents include low molecular glycol ethers containing an alkoxy group having at least 3 carbon atoms. Representative glycol ethers include 2-butoxyethanol (ethylene glycol monobutyl ether); propylene glycol butyl ether; (diethylene glycol) monobutyl ether; and 2-isopropoxy-ethanol. 2-Butoxyethanol (BGE) is preferred.

Preferably the low molecular weight polymers or copolymers are made in the desired solvent and maintained therein in the composition of the invention. Less preferably, they are made in another solvent, such as isopropanol solvent, the solvent removed, and the desired glycol ether solvent added.

The composition of the invention also includes low molecular weight copolymers of vinyl caprolactam with one or more monomers selected from vinylpyrrolidone; acrylamide; N-alkyl acrylamides, e.g. N,N-dimethylamino acrylamide; N-[1-(2-pyrrolidonylethyl] acrylamide; N,N-dialkyl aminoalkyl methacrylamide, e.g. N,N-dimethylamino propyl methacrylamide; N,N-dialkyl aminoalkyl (meth) acrylates; e.g. N,N-dimethylaminoethyl (meth)acrylate and quaternized salts thereof, including N-alkyl bromides; tetrahydrofurfuryl methacrylate; and the like. Copolymers with vinylpyrrolidone monomer is preferred.

The following examples are provided to illustrate the invention.

GENERAL METHOD

The gas hydrate inhibition tests were conducted in a 500 ml, 316 stainless steel autoclave vessel having a usable volume of 200 ml, equipped with a thermostated cooling jacket, sapphire window, inlet and outlet, platinum resistance thermometer (PRT) and magnetic stirring pellet. The rig is rated up to 400° C. and down to −25° C. Temperature and pressure are data logged, while the cell content is visually monitored by a boroscope video camera connected to a time lapsed video recorder. Hydrate formation in the rig is detected using a combination of three methods: visual detection of hydrate crystals, decrease in vessel pressure due to gas uptake and by the temperature exotherm created by heat released during hydrate formation.

The rig was cleaned prior to running a blank and/or test solutions. An air drill with wet and dry emery paper was used to remove traces of any adsorbed chemicals therein with a small amount of water added to the rig. The vessel was then rinsed several times with double distilled water. A blank solution of 200 ml of double distilled water was run to confirm test reproducibility. The formation of hydrates within 7–15 minutes was taken as a standard time for a given set of testing conditions, i.e. Ravenspurn gas, 60 bar and 4° C. The cleaning procedue was repeated until a reproducible time was achieved.

Ravenspurn synthetic gas mixture (Southern North Sea) was used for hydrate testing:

| Component | Mol % |
|---|---|
| $CO_2$ | 1.0 |
| Methane | 95.31 |
| Ethane | 2.96 |
| Propane | 0.53 |
| Iso-Butane | 0.1 |
| n-Butane | 0.1 |

Experimental Procedure for Evaluation of Hydrate Inhibitors 200 ml of pre-cooled polymer solution (with total concentration equal to 0.5 wt %) was placed into the vessel, followed by a PTFE stirrer pellet. The rig top was replaced and the securing ring tightened. The boroscope and video camera were then attached to the apparatus. The rig was then stirred and allowed to cool to the required temperature. Upon reaching the pre-set temperature, the stirrer was stopped and the video recorder and computer data logger started. The rig was then charged with Ravenspurn gas to reach the required pressure. A slightly higher pressure (2–3 bars) was used to allow for some gas dissolution in the water and the slight drop in the pressure as the gas cools. The stirrer was started at 500 rpm and the temperature (4° C.), pressure (60 bar) and start time ($t_o$) recorded. The run was terminated upon the formation of hydrates, usually at the moment of a pressure drop, which might or might not follow the exotherm and visual hydrates formation depending on the amount of the hydrates formed and the amplitude of the effect. The final temperature, pressure and time (t) of the hydrates formation were noted.

The onset of the hydrate formation time=$t-t_o$ (mins) is indicated in the examples given below. Normally, the test was considered to be a successful pass when no hydrate formation was observed within 48 hours of a run. Some tests were terminated before 48 hours even when no hydrate formation was noted in the rig. The relative efficiencies of the inhibiting polymers are thus proportional to the measured induction times.

Since the equilibrium melting temperature for hydrate decomposition for the Ravenspurn gas in double distilled water and P=60 bar is about 13° C., the hydrate sub-cooling is equal to 9° C. (T=4° C. is the temperature of the measurements).

Preparation of Polymers

Examples 1–3 below illustrate the direct preparation of low molecular weight poly(vinyl caprolactam) (PVCL) in 2-butoxyethanol (BGE), which product shows excellent hydrate inhibition as compared to PVCL polymer prepared in isopropanol and isolated and then tested in BGE (see comparative Example A below).

EXAMPLE 1

300 g. of 2-butoxyethanol was charged into a 1-liter resin reaction fitted with a propeller agitator, a reflux condenser, a nitrogen inlet tube and a thermowatch, and heated to 150° C. A monomer pre-mix was prepared by mixing 200 g. of vinyl caprolactam with 4.00 g of di-t-butyl peroxide initiator in a 400-ml beaker. Then the monomer pre-mix was pumped into the reaction kettle over a period of 2 hours. The reaction mixture then was held at 150° C. for 1.5 hours before adding 0.50 g of di-t-butyl peroxide initiator, and held at 150° C. for an additional 3 hours. After cooling to room temperature, the product was a light brown, viscous poly(vinyl caprolactam) in 2-butoxyethanol at 40% solids. Residual vinyl caprolactam was 0.9% by GC analysis. The PVCL polymer had a relative viscosity of 1.074 (1% in 2-butoxy-ethanol), a GPC molecular weight of 1,210 (polyethylene glycol standard), and a cloud point of 42° C.

Hydrate inhibition testing of the product at 4° C., 60 bar using Ravenspurn gas indicated that 0.5% PVCL with 0.75% 2-butoxyethanol in distilled water showed 9 passes out of 13 tests.

EXAMPLE 2

The procedure of Example 1 was followed except that two booster initiators were added twice every 1.5 hours. Light brown, viscous poly(vinyl caprolactam) in 2-butoxyethanol at 40% solids was obtained after cooling to room temperature. Residual vinyl caprolactam was 0.6% by GC analysis. The PVCL polymer had a relative viscosity of 1.064 (1% in 2-butoxyethanol), a GPC molecular weight of 780 (polyethylene glycol standard) and a cloud point of 41° C.

Hydrate inhibition testing at 4° C., 60 bar using Ravenspurn gas indicated that 0.5% PVCL with 0.75% 2-butoxyethanol in distilled water showed 3 to 4 passes out of 7 tests.

EXAMPLE 3

The procedure of Example 1 was followed except that the reaction was performed at 145° C. and two booster initiators were added twice every 1.5 hours. Light brown, viscous poly(vinyl caprolactam) in 2-butoxyethanol at 40% solids was obtained after cooling to room temperature. Residual vinyl caprolactam was 0.25% by GC analysis. The PVCL polymer had a relative viscosity of 1.082 (1% in 2-butoxyethanol) and a GPC molecular weight of 1,310 (polyethylene glycol standard) and a cloud point of 42° C.

Hydrate inhibition testing at 4° C., 60 bar using Ravenspurn gas indicated that 0.5% PVCL with 0.75% 2-butoxyethanol in distilled water showed 4 passes out of 6 tests.

Examples 4–5 illustrate the direct preparation of moderate and high molecular weight poly(vinyl caprolactam) (PVCL) in 2-butoxyethanol (BGE). These polymers show excellent hydrate inhibition over comparable PVCL polymers prepared and isolated from isopropanol and then tested in BGE (see comparative Example B below).

EXAMPLE 4

300 g. of 2-butoxyethanol was charged into a 1-liter resin reaction kettle fitted with a propeller agitator, a reflux condenser, a nitrogen inlet tube, and a thermowatch and heated to 62° C. A monomer pre-mix was prepared by mixing 200 g. of vinyl caprolactam with 4.00 g of t-butyl peroxypivalate initiator (Lupersol 11, 75% active; Elf Atochem) in a 400-ml beaker. The monomer pre-mix then was pumped into the reaction kettle over a period of 2 hours. The reaction mixture was held at 62° C. for 1.5 hours. Thereafter 0.50 g of t-butyl peroxypivalate was added twice every 1.5 hours at 62° C. A light-brown, viscous poly(vinyl caprolactam) in 2-butoxyethanol product at 40% solids was obtained after cooling to room temperature. Residual vinyl caprolactam was 0.26% by GC analysis. The polymer had a relative viscosity of 1.262 (1% in 2-butoxyethanol), a GPC molecular weight of 10,950 (polyethylene glycol standard).

Hydrate inhibition testing at 4° C., 60 bar using Ravenspurn gas using a composition of 0.5% PVCL and 0.75% 2-butoxyethanol in distilled water showed 1 passes out of 4 tests.

EXAMPLE 5

210 g. of vinyl caprolactam and 90 g. of 2-butoxyethanol were charged into an 1-liter resin reaction kettle fitted with a propeller agitator, a reflux condenser, a nitrogen inlet tube, and a thermowatch. The reaction mixture was heated to 62° C. and maintained at this temperature throughout the polymerization. After adding 1.05 g of t-butyl peroxypivalate initiator (Lupersol 11, 75% active; Elf Atochem), an exotherm to 85° C. occurred 30 minutes later. After adding 50 g of 2-butoxyethanol, the solids content was reduced to 60% and the reaction temperature was decreased to 62° C. at the end of next 30 minutes. Another 1.05 g of t-butyl peroxypivalate initiator was added and the reaction was held at 62° C. for 60 minutes. At this point, the solids content was further decreased to 50% by the addition of 70 g. of 2-butoxy-ethanol. Thereafter 1.05 g of t-butyl peroxypivalate was added hourly four times at 62° C. A light-brown, viscous poly(vinyl caprolactam) in 2-butoxyethanol at 50% solids was obtained after cooling to room temperature. Residual vinyl caprolactam was 0.17% by GC analysis. The polymer has a relative viscosity of 1.451 (1% in 2-butoxyethanol), a GPC molecular weight of 31,250 (polyethylene glycol standard).

Hydrate inhibition testing at 4° C., 60 bar using Ravenspurn gas with 0.5% PVCL and 0.75% 2-butoxyethanol in distilled water showed 2 passes out of 4 tests.

Example 6 below illustrates the preparation of a low molecular-weight vinyl caprolactam (VCL)/vinyl pyrrolidone (VP) (75/25) copolymer in 2-butoxyethanol. Hydrate inhibition enhancement by the low molecular-weight VCL/VP (75/25) copolymer made directly in 2-butoxyethanol is superior to VCL/VP (75/25) copolymer powder made in isopropanol, followed by solvent removal and addition of 2-butoxyethanol solvent (Comparative Example C).

EXAMPLE 6

300 g. of 2-butoxyethanol was charged into a 1-liter resin kettle fitted with a propeller agitator, a reflux condenser, a nitrogen inlet tube, and a thermowatch. The reactor was heated to 150° C. and maintained at this temperature throughout. A monomer pre-mix was prepared by mixing 150.0 g. of vinyl caprolactam, 50.0 g. of vinyl pyrrolidone and 4.00 g. of di-t-butyl peroxide initiator (Luperox DI, 95% liquid; Elf Atochem) in a 400-ml beaker. The monomer pre-mix was pumped into the kettle over a period of 2 hours. The reaction was then held at 150° C. for 1.5 hours. Thereafter 0.50 g of di-t-butyl peroxide was added and the reaction was held 150° C. for 3 hours. At the end of the reaction, a 40% light brown, viscous poly(vinyl caprolactam) in 2-butoxyethanol was obtained after cooling to room temperature. Residual vinyl caprolactam and vinyl pyrrolidone were 0.097% and 0.022%, respectively, by GC analysis. The copolymer has a relative viscosity of 1.094 (1% in 2-butoxyethanol), a GPC molecular weight of 2,080 (polyethylene glycol standard) and a cloud point of 55° C.

Hydrate inhibition testing at 4° C., 60 bar using Ravenspurn gas with 0.5% VCL/VP (75/25) copolymer and 0.75% of 2-butoxyethanol in distilled water showed 4 passes out of 8 tests. In comparison with Comparative Example C below, the low molecular weight VCL/VP (75/25) copolymer made in 2-butoxyethanol of the present invention shows significant hydrate inhibition enhancement.

COMPARATIVE EXAMPLES

Comparative Example A below illustrates that the preparation of low molecular weight poly(vinyl caprolactam) (PVCL) made in isopropanol, followed by solvent removal to provide the dry polymer powder. Hydrate inhibition enhancement by low molecular weight PVCL made directly in 2-butoxyethanol is superior to combining dry PVCL in water with 2-butoxyethanol (BGE).

COMPARATIVE EXAMPLE A 1,890.0 g. of isopropanol was charged into a 3-liter resin kettle fitted with a propeller agitator, a reflux condenser, a nitrogen inlet tube, and a thermowatch, and was heated to 78° C. A monomer pre-mix was prepared by mixing 210 g. of vinyl caprolactam with 4.20 g of t-amyl peroxy-2-ethylhexanoate initiator (Lupersol® 575, 95% liquid; Elf Atochem) in a 400-ml beaker. The monomer pre-mix was then pumped into reaction kettle over a period of 2 hours. The reaction was held at 78° C. for 1 hour. Thereafter 1.50 g of t-amyl peroxy-2-ethyl-hexanoate was added hourly for 3 times. A light-brown, viscous poly(vinyl caprolactam) (PVCL) in isopropanol at 10% was obtained after cooling to room temperature. Residual vinyl caprolactam was 0.18% by GC analysis. The polymer has a relative viscosity of 1.080 (1% in isopropanol), a GPC molecular weight of 1,510 (polyethylene glycol standard), indicating that it is a low molecular weight polymer. The polymer in distilled water (1%) had a cloud point of 40° C. Dry PVCL powder was obtained by vacuum stripping.

Hydrate inhibition testing at 4° C., 60 bar using Ravenspurn gas indicated that 0.5% dry PVCL powder in distilled water showed 1–2 passes out of 6 tests and 0.5% dry PVCL powder in distilled water with 0.75% BGE showed 2 passes out of six tests. Under the identical testing conditions, 0.5% PVCL powder in distilled water with 4.5% isopropanol showed zero passes out of 3 tests. These testing results indicated some hydrate inhibition enhancement by combining low molecular weight PVCL (made in isopropanol and then solvent stripped) in water with 2-butoxyethanol; however its performance enhancement does not equal that of low molecular weight PVCL made directly in 2-butoxyethanol.

COMPARATIVE EXAMPLE B

This example illustrates the preparation of high molecular weight poly(vinyl caprolactam) (PVCL) in ethanol/water (50/50, w/w), followed by solvent removal to obtain dry polymer powder. Hydrate inhibition enhancement by high molecular weight PVCL made directly in 2-butoxyethanol (Example 5) is superior to combining PVCL dry powder with 2-butoxyethanol (BGE).

62.5 g. of ethanol and 187.5 g. of distilled water were charged into a 1-liter resin kettle fitted with a propeller agitator, a reflux condenser, a nitrogen inlet tube, and a thermowatch. The reaction was heated to 55° C. and maintained at this temperature throughout the experiment. A monomer pre-mix was prepared by mixing 250 g. of vinyl caprolactam with 5.00 g of t-butyl peroxypivalate initiator (Lupersol 11, 75% active; Elf Atochem) in a 400-ml beaker. About 20% of the monomer pre-mix (50 g.) were added to the kettle initially and the remaining pre-mix was pumped into the kettle over a period of 2 hours. The reaction was then held at 55° C. for 2 hours. Thereafter 0.50 g of t-butyl peroxypivalate was added and the reaction was held 55° C.

for 1 hour. The step was repeated once. At the end of the reaction, additional 125.0 g. of ethanol was added to yield a 40% light brown, viscous poly(vinyl caprolactam) in ethanol/water (50/50, w/w) after cooling to room temperature. Residual vinyl caprolactam was 0.25% by GC analysis. The polymer has a relative viscosity of 1.507 (1% in ethanol/water (50/50, w/w), a GPC molecular weight of 63,450 (polyethylene oxide standard). Dry PVCL powder was obtained by vacuum stripping.

Hydrate inhibition testing at 4° C., 60 bar using Ravenspurn gas of 0.5%. dry PVCL powder in distilled water showed zero passes out of 6 tests and 0.5% PVCL with 0.75% of 2-butoxyethanol in distilled water showed 1 pass out of 4 tests. In comparison with the testing results of Example 5, the hydrate inhibition enhancement by high molecular weight PVCL made in 2-butoxyethanol is better than dry, high molecular weight PVCL (made in isopropanol and then solvent removed, Example 5) in 2-butoxyethanol solvent.

COMPARATIVE EXAMPLE C

This example illustrates the preparation of low molecular-weight vinyl caprolactam (VCL)/vinyl pyrrolidone (VP) (75/25) copolymer made in isopropanol, followed by solvent removal to obtain dry polymer powder. Hydrate inhibition enhancement by low molecular-weight VCL/VP (75/25) copolymer made directly in 2-butoxyethanol (Example 6) is superior to merely dissolving VCL/VP (75/25) copolymer powder in 2-butoxyethanol (BGE) solvent.

630 g. of isopropanol was charged into a 1-liter resin kettle fitted with a propeller agitator, a reflux condenser, a nitrogen inlet tube, and a thermowatch. The reactor was heated to 82° C. and maintained at this temperature throughout the experiment. A monomer premix was prepared by mixing 52.50 g of vinyl caprolactam, 17.50 g of vinyl pyrrolidone and 1.40 g of t-amyl peroxy-2-ethylhexanoate initiator (Lupersol 575, 95% liquid; Elf Atochem) in a 250-ml beaker. The monomer pre-mix was pumped into the kettle over a period of 2 hours. The reaction then was held at 82° C. for 1 hour. Thereafter 0.50 g of t-amyl peroxy-2-ethylhexanoate was added and the reaction was held 82° C. for 1 hour. The step was repeated twice. At the end of the reaction, a 10% light-brown, viscous poly(vinyl caprolactam) in isopropanol was obtained after cooling to room temperature. Residual vinyl caprolactam was 0.21% by GC analysis. The polymer had a relative viscosity of 1.084 (1% in isopropanol), a GPC molecular weight of 2,640 (polyethylene glycol standard). Dry VCL/VP (75/25) copolymer powder was obtained by vacuum stripping.

Hydrate inhibition testing at 4° C., 60 bar using Ravenspurn gas indicated that 0.5% VCL/VP (75/25) copolymer with 4.5% isopropanol in distilled water showed only 1 pass out of 4 tests. In a similar test, 0.5% VCL/VP (75/25) copolymer and 0.75% of 2-butoxyethanol in distilled water showed only 1 pass out of 6 tests. In comparison with Example 6, the hydrate inhibition enhancement of low molecular weight VCL/VP (75/25) copolymer made in 2-butoxyethanol is greater than dry, low molecular weight VCL/VP (75/25) copolymer (made in isopropanol and then solvent removed, Example 5) with 2-butoxyethanol solvent.

The low-molecular weight VCL-based polymers synthesized and tested in the presence of BGE also have improved hot brine compatibility, which supports liquid—liquid phase separation. On the other hand, precipitate formation was observed in the case of high mw P(VCL).

Low mw PVCL made in BGE also possess advantages over its high molecular weight analog with respect to enhanced hot brine compatibility controlled by the amount of added BGE, a higher cloud point and quick polymer re-dissolution upon moving to room temperature and distilled water conditions.

While the invention has been described with particular reference to certain embodiments thereof, it will be understood that changes and modifications may be made which are within the skill of the art. Accordingly, it is intended to be bound only by the following claims, in which:

What is claimed is:

1. A method for preventing or retarding the formation of gas hydrates or for reducing the tendency of gas hydrates to agglomerate, during the transport of a fluid comprising water and a hydrocarbon, through a conduit, which comprises adding to said fluid a composition comprising, (a) a homopolymer of vinyl caprolactam, or copolymer thereof, having a molecular weight in the range of about 500 to about 2500, (GPC, polyethylene glycol standard) and (b) a solvent which is a glycol ether containing an alkoxy group having at least 3 carbon atoms, wherein said homopolymer or copolymer is synthesized and used in said solvent.

2. A method according to claim 1 wherein said solvent is 2-butoxyethanol.

3. A method according to claim 1 wherein said polymer or copolymer comprises about 30 to about 50% by weight of said composition.

4. A method according to claim 1 wherein said gas hydrate inhibiting polymer or copolymer concentration in the conduit is about 0.1 to 3% by weight.

\* \* \* \* \*